(12) United States Patent
Nandagopalan et al.

(10) Patent No.: US 8,892,056 B2
(45) Date of Patent: *Nov. 18, 2014

(54) PROTOCOL ADAPTATION LAYER FOR WIRELESS COMMUNICATIONS

(71) Applicant: Broadcom Corporation, Irvine, CA (US)

(72) Inventors: Saishankar Nandagopalan, San Diego, CA (US); Christopher J. Hansen, Los Altos, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/141,216

(22) Filed: Dec. 26, 2013

(65) Prior Publication Data

US 2014/0106678 A1    Apr. 17, 2014

Related U.S. Application Data

(63) Continuation of application No. 12/611,490, filed on Nov. 3, 2009, now Pat. No. 8,644,770.

(60) Provisional application No. 61/117,711, filed on Nov. 25, 2008.

(51) Int. Cl.
| | | |
|---|---|---|
| *H04B 1/00* | (2006.01) | |
| *H04B 7/00* | (2006.01) | |
| *H04W 84/12* | (2009.01) | |
| *H04W 76/04* | (2009.01) | |
| *H04W 72/04* | (2009.01) | |
| *H04W 4/00* | (2009.01) | |
| *H04W 88/06* | (2009.01) | |
| *H04W 84/18* | (2009.01) | |

(52) U.S. Cl.
CPC ............. *H04W 4/008* (2013.01); *H04W 84/12* (2013.01); *H04W 76/041* (2013.01); *H04W 72/048* (2013.01); *H04W 88/06* (2013.01); *H04W 84/18* (2013.01)
USPC .......................................................... 455/69

(58) Field of Classification Search
CPC ............................... H04W 88/06; H04W 84/18
USPC ......... 455/69, 67.11, 41.2, 553.1, 126, 127.4, 455/423, 115.1, 226.1
See application file for complete search history.

(56) References Cited

U.S. PATENT DOCUMENTS

| | | | | |
|---|---|---|---|---|
| 7,228,129 B1* | 6/2007 | Ward et al. | ..................... | 455/423 |
| 8,644,770 B2* | 2/2014 | Nandagopalan et al. | ........ | 455/69 |

* cited by examiner

*Primary Examiner* — Eugene Yun
(74) *Attorney, Agent, or Firm* — Garlick & Markison; Shayne X. Short

(57) ABSTRACT

Protocol adaptation layer for wireless communications. Communication devices that include one or more radio modules operable in accordance with multiple communication protocols establish communications using one communication protocol and then switch to another communication protocol. This switching to another communication protocol may be performed based on a variety of factors including effectuating communications of higher throughput, supporting uni-directional communications vs. bi-directional communications, or any other desired factor. In some embodiments, various communication devices include two radio modules that are each implemented to operate in accordance with one particular communication protocol. Alternatively, a multi-protocol capable radio module may support and operate in accordance with more than one communication protocol. Examples of possible communication protocols include those compliant with Bluetooth, IEEE 802.11, and/or 802.15.3c.

20 Claims, 16 Drawing Sheets

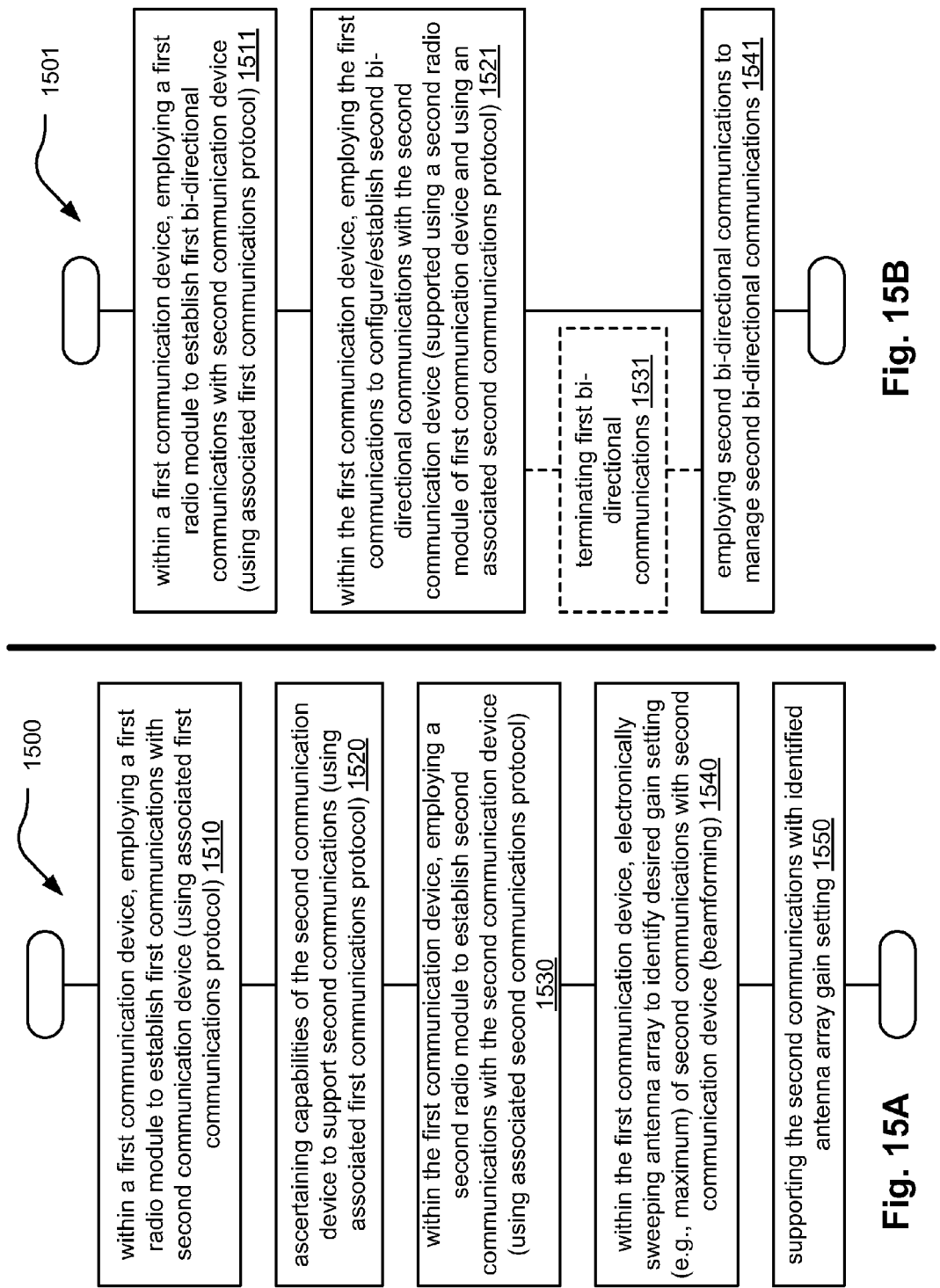

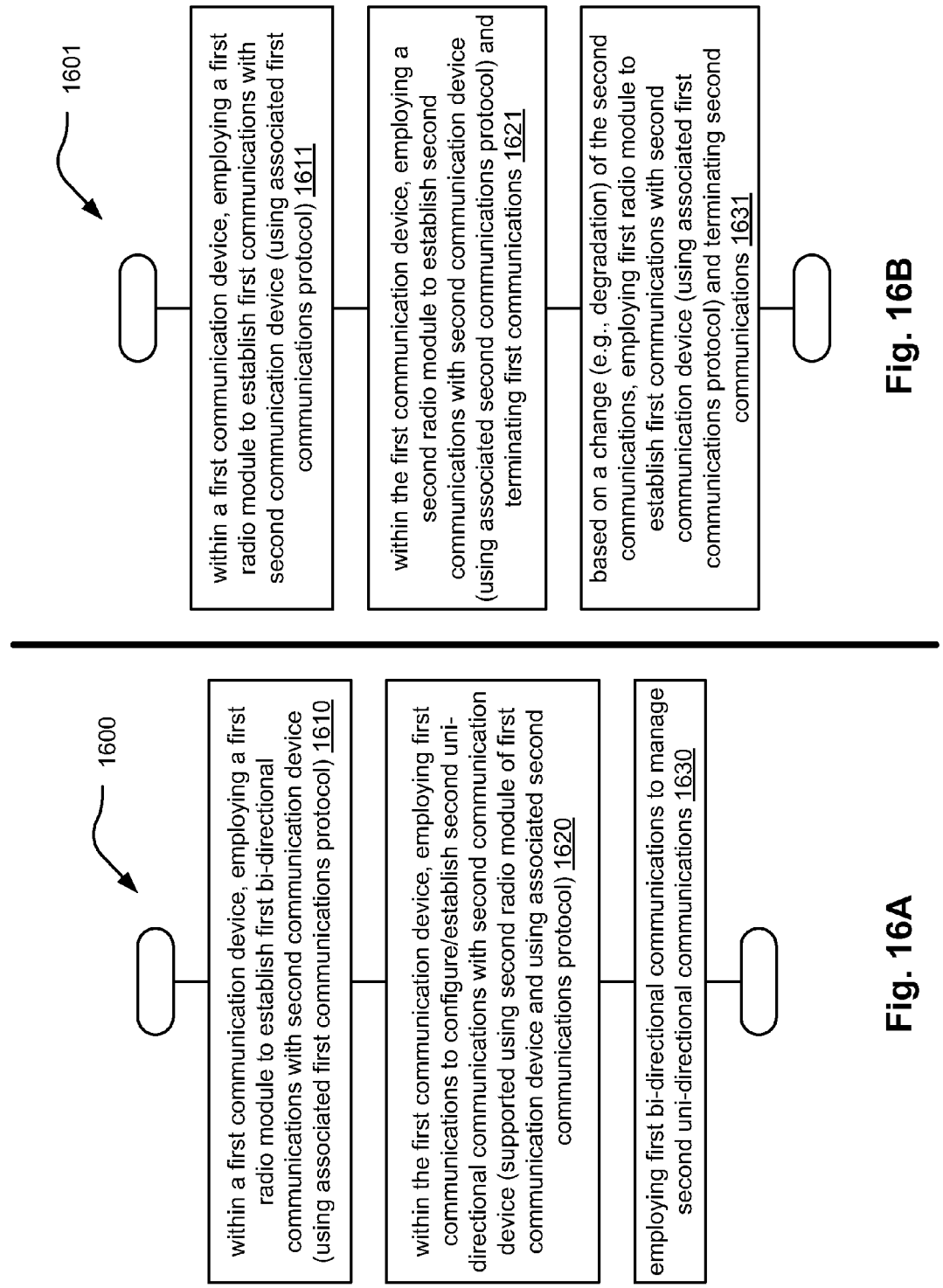

PROTOCOL ADAPTATION LAYER FOR WIRELESS COMMUNICATIONS

CROSS REFERENCE TO RELATED PATENTS/PATENT APPLICATIONS

Continuation Priority Claim, 35 U.S.C. §120

The present U.S. Utility Patent Application claims priority pursuant to 35 U.S.C. §120, as a continuation, to the following U.S. Utility Patent Application which is hereby incorporated herein by reference in its entirety and made part of the present U.S. Utility Patent Application for all purposes:

1. U.S. Utility patent application Ser. No. 12/611,490, entitled "Protocol adaptation layer for wireless communications," filed Nov. 3, 2009, which claims priority pursuant to 35 U.S.C. §119(e) to the following U.S. Provisional Patent Application which is hereby incorporated herein by reference in its entirety and made part of the present U.S. Utility Patent Application for all purposes:

a. U.S. Provisional Application Ser. No. 61/117,711, entitled "Protocol adaptation layer for wireless communications," filed Nov. 25, 2008.

INCORPORATION BY REFERENCE

The following U.S. Utility Patent Applications are hereby incorporated herein by The following U.S. Utility Patent Application is hereby incorporated herein by reference in its entirety and is made part of the present U.S. Utility Patent Application for all purposes:

1. U.S. Utility patent application Ser. No. 11/849,786, entitled "Method and system for utilizing a 60 GHz PHY layer for high speed data transmission between Bluetooth devices," filed Sep. 4, 2007, now issued a U.S. Pat. No. 7,840,184 on Nov. 23, 2010, which claims priority pursuant to 35 U.S.C. §119(e) to the following U.S. Provisional Patent Application which is hereby incorporated herein by reference in its entirety and made part of the present U.S. Utility Patent Application for all purposes:

a. U.S. Provisional Application Ser. No. 60/943,990, entitled "Method and system for an alternate physical interface transceiver for Bluetooth," filed Jun. 14, 2007.

BACKGROUND OF THE INVENTION

1. Technical Field of the Invention

The invention relates generally to communication systems; and, more particularly, it relates to establishing and managing communications between various communication devices within such communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), Enhanced Data rates for GSM Evolution (EDGE), General Packet Radio Service (GPRS), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, etc. communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to an antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

While transmitters generally include a data modulation stage, one or more IF stages, and a power amplifier, the particular implementation of these elements is dependent upon the data modulation scheme of the standard being supported by the transceiver. For example, if the baseband modulation scheme is Gaussian Minimum Shift Keying (GMSK), the data modulation stage functions to convert digital words into quadrature modulation symbols, which have a constant amplitude and varying phases. The IF stage includes a phase locked loop (PLL) that generates an oscillation at a desired RF frequency, which is modulated based on the varying phases produced by the data modulation stage. The phase modulated RF signal is then amplified by the power amplifier in accordance with a transmit power level setting to produce a phase modulated RF signal.

As another example, if the data modulation scheme is 8-PSK (phase shift keying), the data modulation stage functions to convert digital words into symbols having varying amplitudes and varying phases. The IF stage includes a phase locked loop (PLL) that generates an oscillation at a desired RF frequency, which is modulated based on the varying phases produced by the data modulation stage. The phase modulated RF signal is then amplified by the power amplifier in accordance with the varying amplitudes to produce a phase and amplitude modulated RF signal.

As yet another example, if the data modulation scheme is x-QAM (16, 64, 128, 256 quadrature amplitude modulation), the data modulation stage functions to convert digital words into Cartesian coordinate symbols (e.g., having an in-phase signal component and a quadrature signal component). The IF stage includes mixers that mix the in-phase signal component with an in-phase local oscillation and mix the quadrature signal component with a quadrature local oscillation to produce two mixed signals. The mixed signals are summed together and filtered to produce an RF signal that is subsequently amplified by a power amplifier.

BRIEF DESCRIPTION OF THE SEVERAL VIEWS OF THE DRAWINGS

FIG. 15A, FIG. 15B, FIG. 16A, and FIG. 16B illustrate embodiments of various methods for performing bi-directional signaling and/or uni-directional signaling and beamforming therein, respectively.

DETAILED DESCRIPTION OF THE INVENTION

Communication systems have been around for some time, and their presence into modern life is virtually ubiquitous (e.g., television communication systems, telecommunication systems including wired and wireless communication systems, etc.). As these communication systems continue to be developed, there is an ever present need for designing various means by which information may be encoded for transmitting from a first location to a second location.

Generally speaking, the goal of digital communications systems is to transmit digital data from one location, or subsystem, to another either error free or with an acceptably low error rate. Data may be transmitted over a variety of communications channels in a wide variety of communication systems: magnetic media, wired, wireless, fiber, copper, and other types of media as well.

There are a variety of types of communication system types and communication device types that may be implemented within such communication systems. There are a variety of communication protocols by which communications within such communication systems may be supported including the IEEE 802.15.3, IEEE 802.11 a/b/g/n, Bluetooth, and others.

Figure 1:
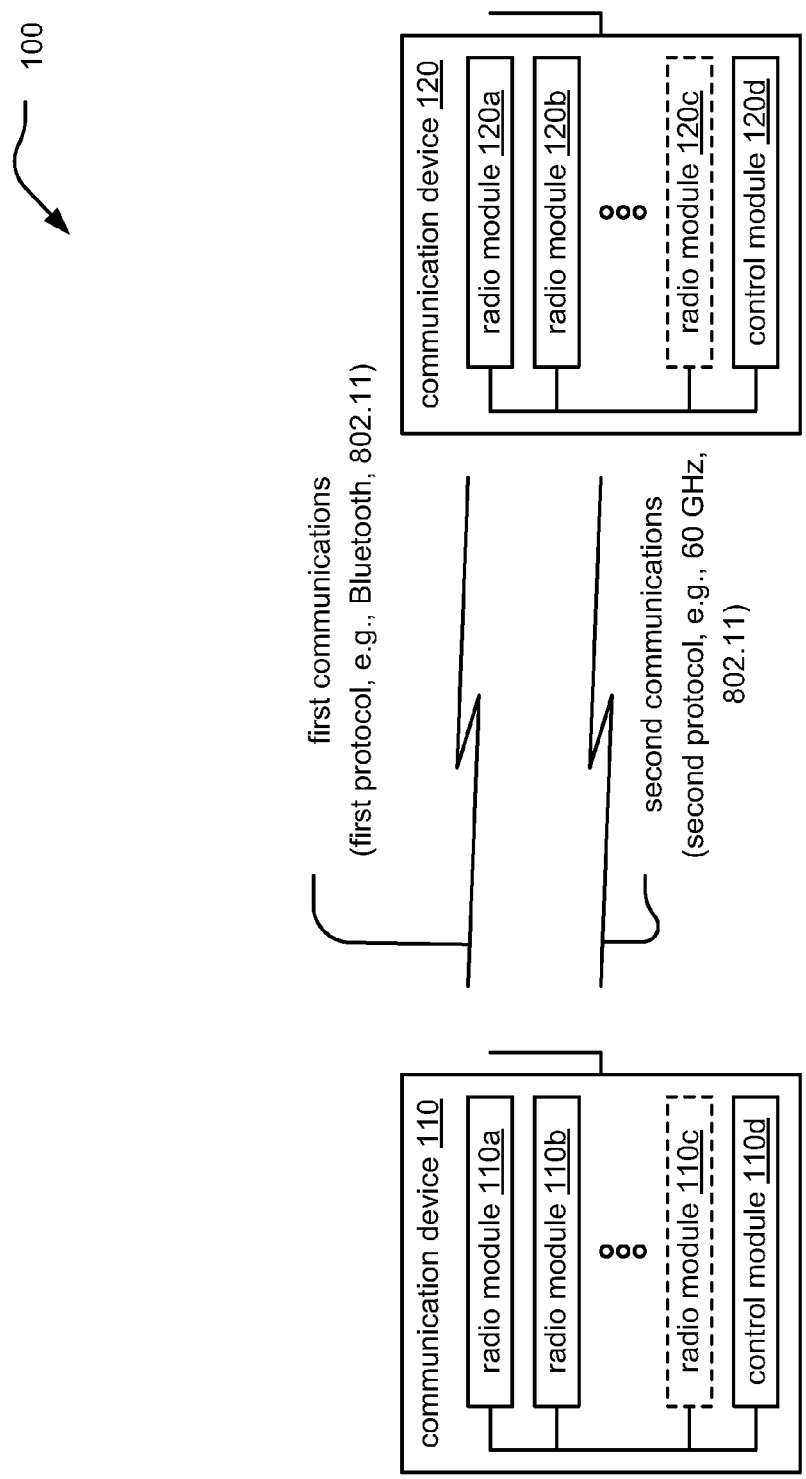
FIG. 1 is a diagram illustrating an embodiment of a communication system including multi-protocol capable communication devices.

FIG. 1 is a diagram illustrating an embodiment of a communication system 100 including multi-protocol capable communication devices 110 and 120. The communication device 110 includes multiple radio modules shown as 110a, 110b, and up to 110c. In some embodiments, only two radio modules 110a and 110b are included within the communication device 110. A control module 110d also coupled to each of the radio modules 110a-110c.

Analogously, the communication device 120 includes multiple radio modules shown as 120a, 120b, and up to 120c. In some embodiments, only two radio modules 120a and 120b are included within the communication device 120. A control module 120d also coupled to each of the radio modules 120a-120c.

These various radio modules within each of the communication devices 110 and 120 may be actually separated implemented circuitries each one dedicated to support a respective communication protocol, separate functional blocks within a single integrated circuit each one dedicated to support a respective communication protocol, or logical partitions within a single radio module that is capable to operate in accordance with multiple communication protocols.

The control module 110d of the communication device 110 establishes communications with the communication device 120 using one of the radio modules with the communication device 110 (e.g., radio 110a). During these initially established communications, the control module 110d ascertains capabilities of the communication device 120 and identifies operational parameters by which subsequent communications may be supported between the communication device 110 and the communication device 120. These subsequent communications may be supported using a different radio module within the communication device 110 (e.g., radio module 110b). The control module 110d then establishes these subsequent communications with the communication device 120 using this alternative radio module in accordance with the identified operational parameters.

In one embodiment, the initially established communications may be viewed as first communications, and the subsequently established communications may be viewed as second communications. In this depicted embodiment, the first communications operate in accordance with a first communication protocol, and the second communications operate in accordance with a second communication protocol. The first protocol may be Bluetooth compliant or IEEE 802.11 compliant, and the second protocol may be 60 GHz compliant (e.g., IEEE 802.15.3c compliant) or IEEE 802.11 compliant.

In certain embodiments, the control module 110d selectively maintains or terminates the first communication between the first radio module 110a and the remote communication device 120 after the second communications between the second radio module 110b and the remote communication device 120 are established based on the second communications being bi-directional or uni-directional. For example, as is also described below within other embodiments, the second communications established between the communication device 110 and the communication device 120 may be uni-directional or bi-directional in nature. Depending on what type the second communications are, the control module 110d selectively maintains or terminates the first communication between the first radio module 110a and the remote communication device 120. For example, if the second communications are bi-directional in nature, then the first communications may be terminated. Alternatively, if the second communications are uni-directional in nature, then the first communications may be maintained.

Moreover, the control module 110d may receives feedback from the remote communication device 120 via the first communications. Thereafter, based on the feedback, the control module 110d may modify at least one of the operational parameters of the second communications between the second radio module and the remote device. In addition, this feedback may be employed also to ascertain the certain capabilities of the communication device 120 and identifies operational parameters by which subsequent communications may be supported between the communication device 110 and the communication device 120.

Figure 2:
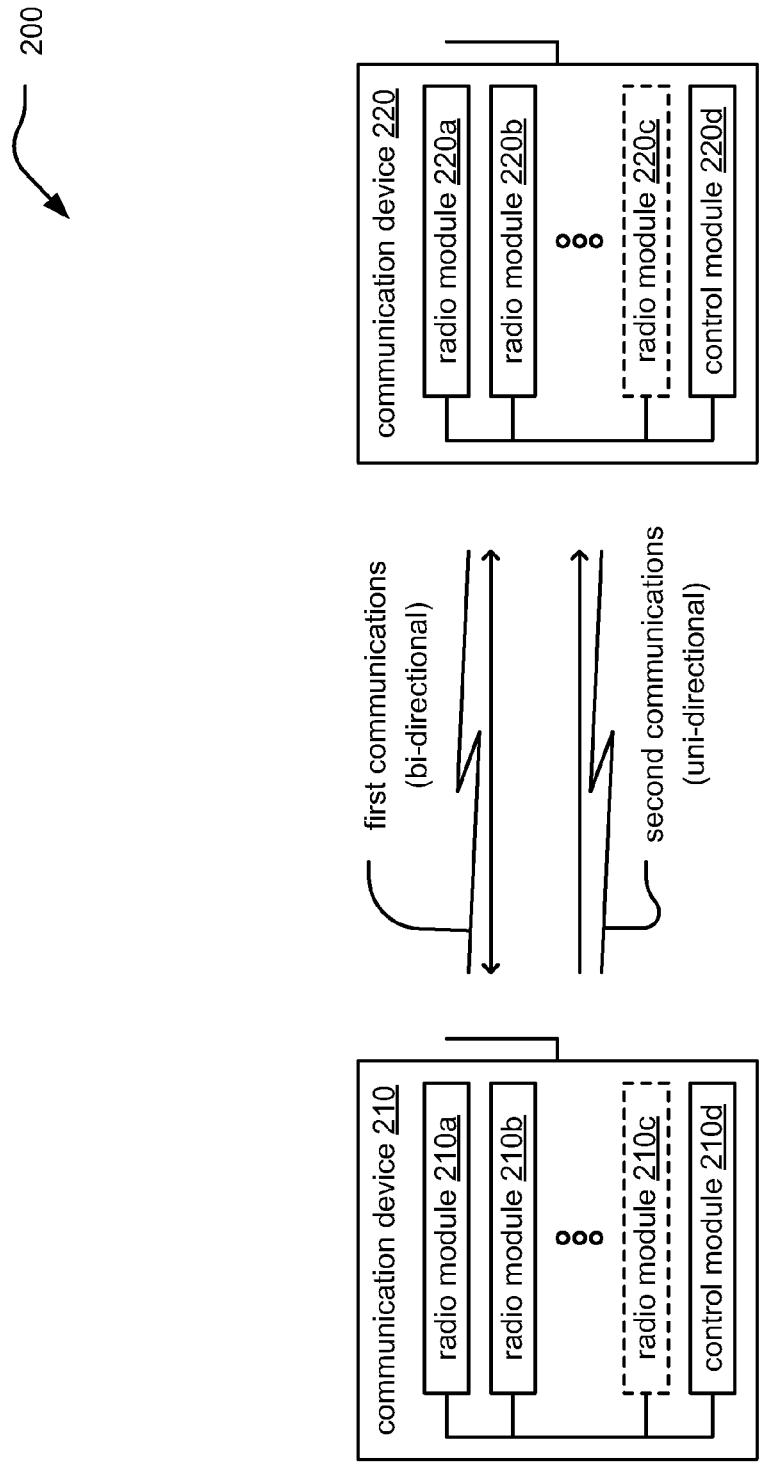
FIG. 2 is a diagram illustrating an alternative embodiment of a communication system including multi-protocol capable communication devices.

FIG. 2 is a diagram illustrating an alternative embodiment of a communication system 200 including multi-protocol capable communication devices 210 and 220. The communication device 210 includes multiple radio modules shown as 210a, 210b, and up to 210c. In some embodiments, only two radio modules 210a and 210b are included within the communication device 210. A control module 210d also coupled to each of the radio modules 210a-210c.

Analogously, the communication device 220 includes multiple radio modules shown as 220a, 220b, and up to 220c. In some embodiments, only two radio modules 220a and 220b are included within the communication device 220. A control module 220d also coupled to each of the radio modules 220a-220c.

These various radio modules within each of the communication devices 210 and 220 may be actually separated implemented circuitries each one dedicated to support a respective communication protocol, separate functional blocks within a single integrated circuit each one dedicated to support a respective communication protocol, or logical partitions within a single radio module that is capable to operate in accordance with multiple communication protocols.

In this embodiment, initially established communications (e.g., first communications) are shown as being bi-directional, and subsequently established communications (e.g., second communications) are shown as being uni-directional. As will also be described with reference to other embodiments herein, there may be instances where communications using one radio/protocol combination are initially employed to ascertain various common functionality and capability of the communication devices 210 and 220. Thereafter, communications may be switched to another radio/protocol combination based on any of a variety of desired (e.g., uni-directional communication, higher throughput, better security/encryption, etc.).

Figure 3:
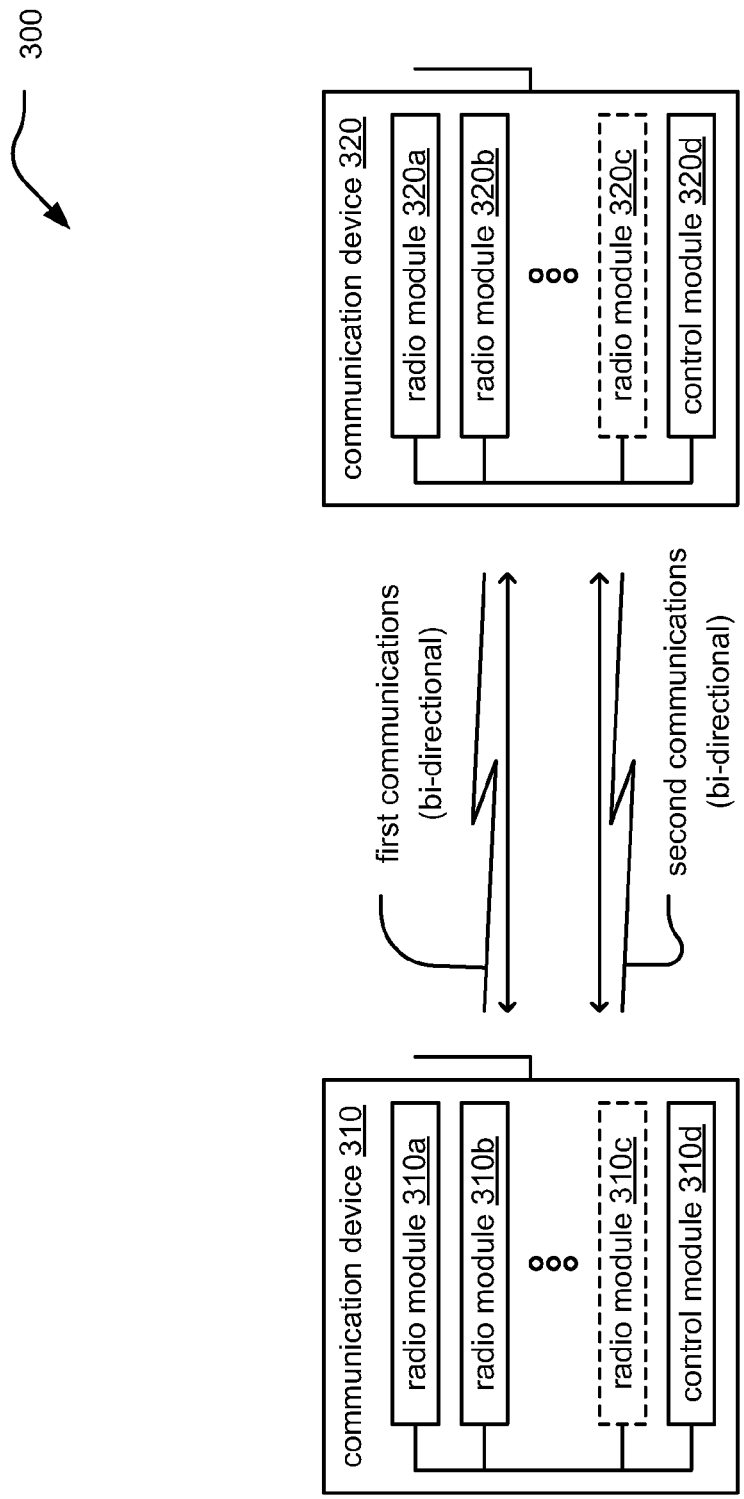
FIG. 3 is a diagram illustrating an alternative embodiment of a communication system including multi-protocol capable communication devices.

FIG. 3 is a diagram illustrating an alternative embodiment of a communication system 300 including multi-protocol capable communication devices 310 and 320.

The communication device 310 includes multiple radio modules shown as 310a, 310b, and up to 310c. In some embodiments, only two radio modules 310a and 310b are included within the communication device 310. A control module 310d also coupled to each of the radio modules 310a-310c.

Analogously, the communication device 320 includes multiple radio modules shown as 320a, 320b, and up to 320c. In some embodiments, only two radio modules 320a and 320b are included within the communication device 320. A control module 320d also coupled to each of the radio modules 320a-320c.

These various radio modules within each of the communication devices 310 and 320 may be actually separated implemented circuitries each one dedicated to support a respective communication protocol, separate functional blocks within a single integrated circuit each one dedicated to support a respective communication protocol, or logical partitions within a single radio module that is capable to operate in accordance with multiple communication protocols.

In this embodiment, initially established communications (e.g., first communications) are shown as being bi-directional, and subsequently established communications (e.g., second communications) are also shown as being bi-directional. Compare this to the previous embodiment of first communications being bi-directional and second communications being uni-directional.

Again, as will also be described with reference to other embodiments herein, there may be instances where communications using one radio/protocol combination are initially employed to ascertain various common functionality and capability of the communication devices 210 and 220. Thereafter, communications may be switched to another radio/protocol combination based on any of a variety of desired (e.g., second higher throughput capable bi-directional communication, better security/encryption, etc.).

Figure 4:
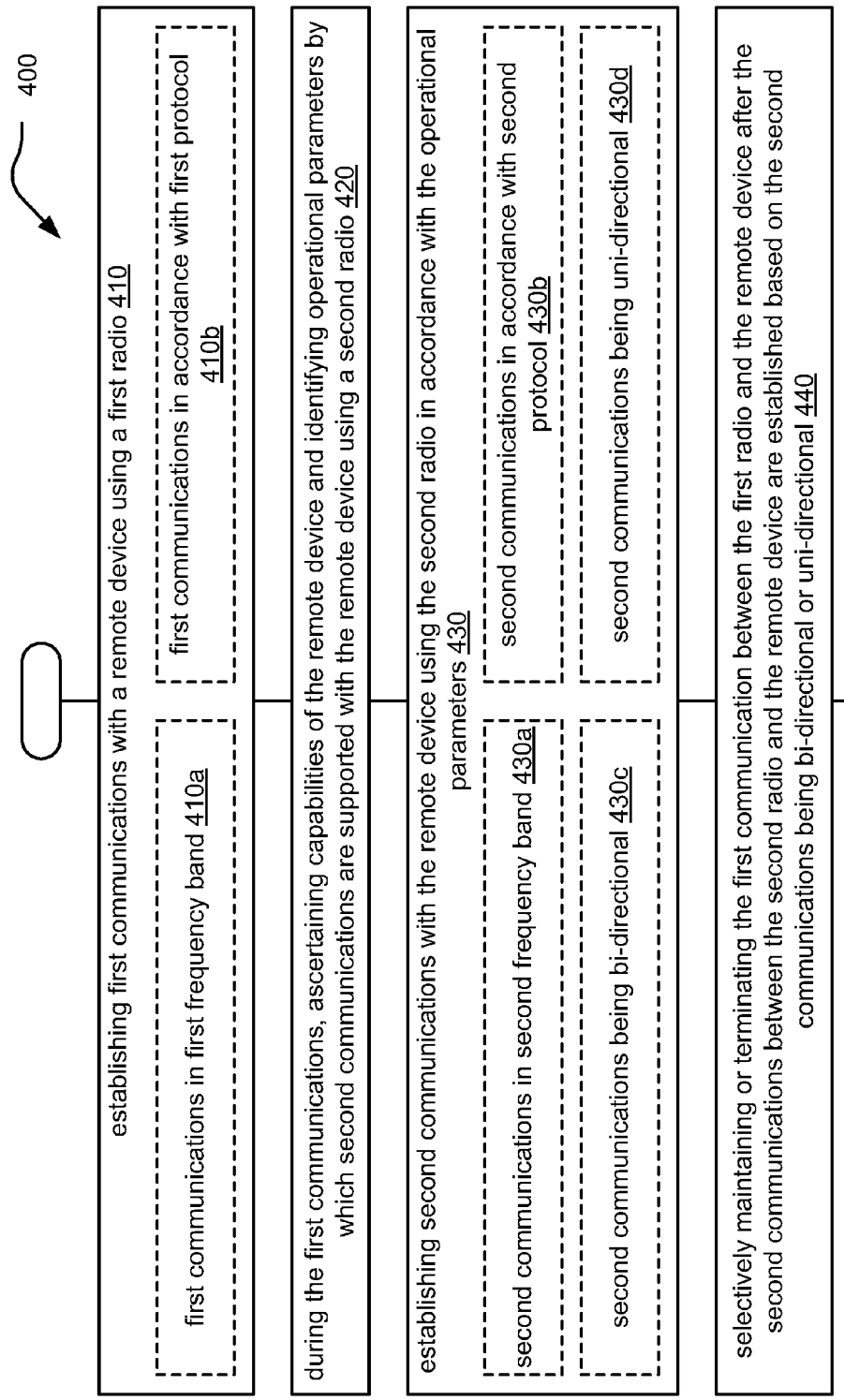
FIG. 4 is a diagram illustrating an embodiment of a method for operating multi-protocol capable communication devices.

FIG. 4 is a diagram illustrating an embodiment of a method 400 for operating multi-protocol capable communication devices. The method 400 begins by establishing first communications with a remote device using a first radio module, as shown in a block 410. It is noted also that the first communications therein may be supported within a first frequency band, as shown in a block 410a. Also, it is noted also that the first communications therein may be supported in accordance with a first communication protocol, as shown in a block 410b.

Then, during the first communications, the method 400 operates by ascertaining capabilities of the remote device and identifying operational parameters by which second communications are supported with the remote device using a second radio module, as shown in a block 420.

The method 400 continues by establishing second communications with the remote device using the second radio module in accordance with the operational parameters, as shown in a block 430. It is noted also that the second communications therein may be supported within a second frequency band, as shown in a block 430a. Also, it is noted also that the second communications therein may be supported in accordance with a second communication protocol, as shown in a block 430*b*. These second communications may be bi-directional (as shown in a block 430*c*) or uni-directional (as shown in a block 430*d*).

The method 400 then operates by selectively maintaining or terminating the first communication between the first radio module and the remote device after the second communications between the second radio module and the remote device are established based on the second communications being bi-directional or uni-directional, as shown in a block 440.

It is noted that the first communications between the first radio module and the remote device may be bi-directional, and the second communications between the first radio module and the remote device may also be bi-directional. Alternatively, the first communications between the first radio module and the remote device may be bi-directional, and the second communications between the first radio module and the remote device may be uni-directional.

In alternative embodiments, the method 400 may also operate by receiving feedback from the remote device via the first communications. Thereafter, based on the feedback, the method 400 may operate by modifying at least one of the operational parameters of the second communications between the second radio module and the remote device.

With respect to wireless communications, it is noted that Bluetooth (sometimes referred to herein BT, and also in the drawings) is one of the fastest growing wireless technologies in the world. By 2007, it is estimated that over 1 billion communication devices will be implemented that operate in accordance with Bluetooth. Another wireless communication protocol, IEEE 802.15.3c (and its variants) are capable to operate at very high frequencies (e.g., 60 GHz), and the IEEE 802.15.3c is capable to support a variety of high throughput requirement communications (e.g., high definition television (HDTV) content, moving large files from one communication device to another in a peer-to-peer manner, etc.).

Herein, a novel solution of Bluetooth adapting the IEEE 802.15.3c MAC/PHY as one of its alternate MAC/PHY (AMP) solutions is presented. This can allow, among other things, an ability to share and transfer high throughput requirement communications (e.g., high definition television (HDTV) content, moving large files from one communication device to another in a peer-to-peer manner, etc.) between various consumer communication device in home, office, and/or other environments. To effectuate this multi-protocol communication, the IEEE 802.15.3c MAC/PHY may be employed as an AMP for Bluetooth. The Bluetooth functionality within a communication device also is able to use the various functionalities of the IEEE 802.15.3c MAC/PHY as and when needed or desired.

Figure 5:
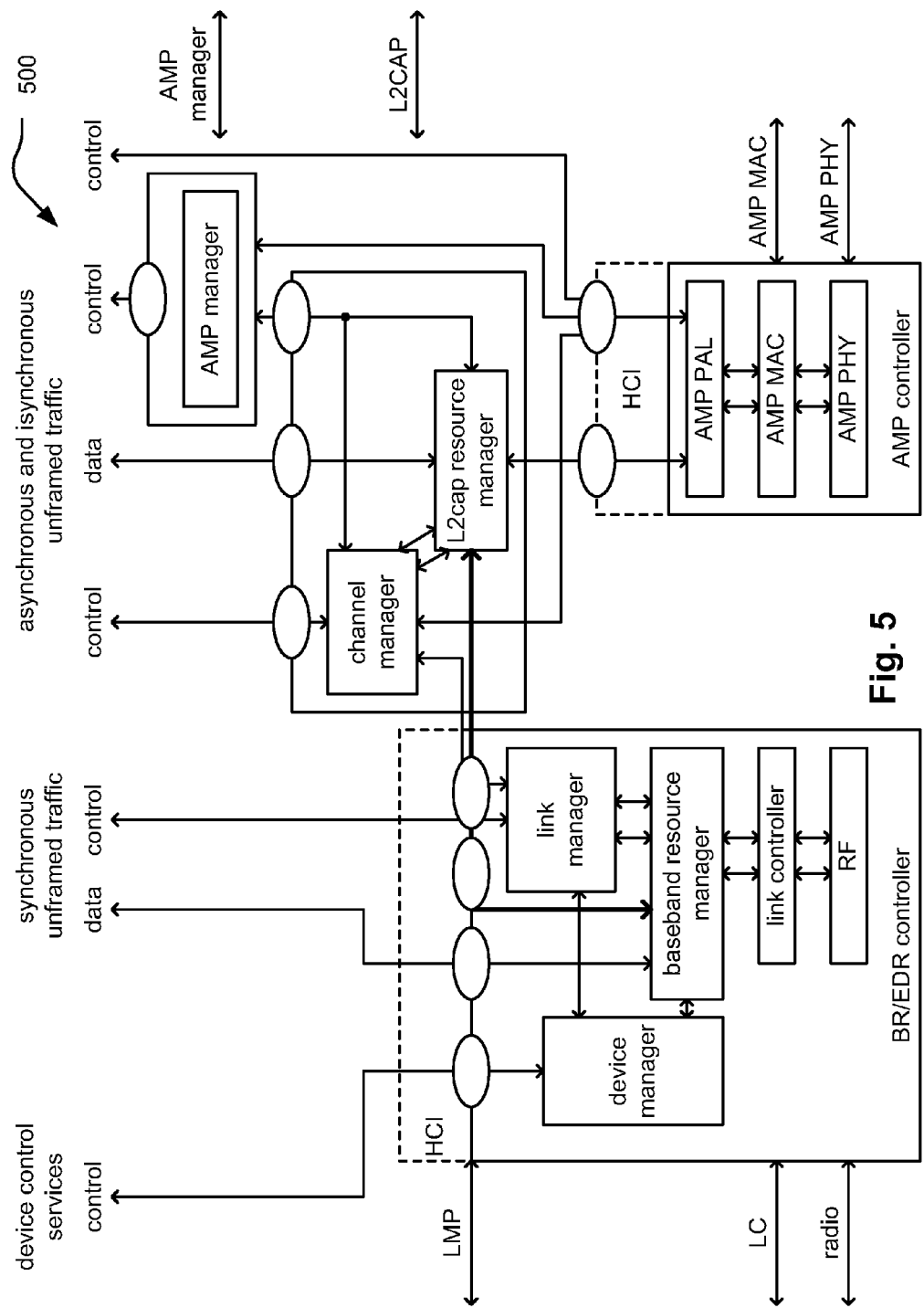
FIG. 5 is a diagram illustrating an embodiment of an alternate MAC/PHY (AMP) architecture operable to support multiple communications protocols.

FIG. 5 is a diagram illustrating an embodiment of an alternate MAC/PHY (AMP) architecture 500 operable to support multiple communications protocols. As can be seen in this diagram, the Bluetooth AMP architecture provides for various types of traffic (e.g., synchronous unframed traffic, asynchronous and isynchronous unframed traffic). It also includes a Bluetooth (BT) Bluetooth Radio/Enhanced Data Rate (BR/EDR) controller that operates in parallel to the AMP controller. The AMP manager sits on top of the Logical Link Control and Adaptation Protocol (L2CAP). In one embodiment, the AMP MAC/PHY of this diagram represents a MAC/PHY compliant with IEEE 802.15.3c (or one of its variants).

With the basic construct and relationships of the AMP Protocol Adaptation Layer (PAL) with the BR/EDR and the AMP manager shown in this diagram, the various AMP paths are provided in the subsequent diagram.

Figure 6:
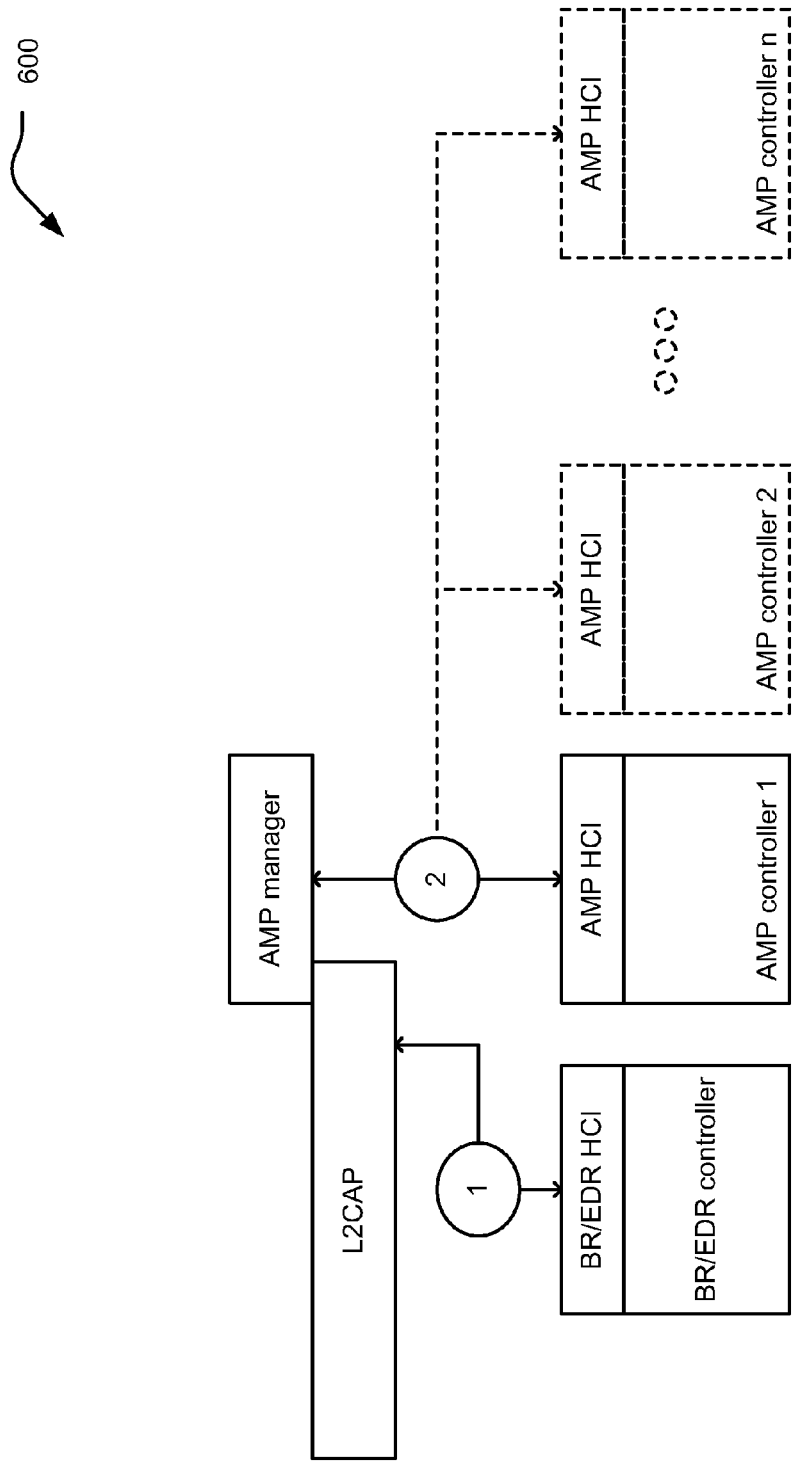
FIG. 6 is a diagram illustrating an embodiment of an alternate MAC/PHY (AMP) path to support multiple communications protocols.

FIG. 6 is a diagram illustrating an embodiment of an alternate MAC/PHY (AMP) path 600 to support multiple communications protocols. As can be seen in this diagram, for a Bluetooth operable communication device to establish communications in a high speed AMP channel, the AMP manager of the local communication device firstly discovers the AMP of the remote communication device. Then, the local communication device ascertains or collects information regarding the AMP of the remote communication device (e.g., functionality, capabilities, protocols, data rates, modulation types, code rates, coding types, Modulation and Coding Schemes (MCSs), etc. that may be supported therein).

The AMP manager of the local communication device then initiates physical link creation with the AMP manager of the remote communication device using a dedicated L2CAP signaling communication channel.

The AMP manager of the local communication device then provides information corresponding to the AMP manager of the remote communication device to the AMP PAL of the local communication device to create the AMP physical link. After the physical link is created, a logical link with a desired Quality of Service (QoS) is set up and a L2CAP communication channel is created over the logical link. The data communication over the high speed channel then proceeds with the desired QoS.

Considering the AMP PAL requirements or desired operational capabilities, such as those that are compliant with IEEE 802.15.3c (or any one of its variants), one is that the Bluetooth functionality within a communication device be configured and implemented to understand the capabilities of the local device (IEEE 802.15.3c) as to modes of operation). For some examples, it should have capability to operate as piconet controller (PNC) or as a slave (or as both). It should have capability to operate in accordance with specific PHY modes available (i.e. single carrier modulation vs. multi-carrier modulation). Also, it should have capability to operate in accordance with different modulation/coding schemes and in accordance with different MAC operating modes (levels of security and power saving techniques).

Also, the AMP manager should be implemented to understand whether to act as PNC or as a slave (sometimes a "slave" within a piconet is referred to as a DEV) and to enable optimal PNC selection if there are multiple PNCs available. This may involve performing negotiation between various communication devices for PNC ownership.

Also, the AMP manager should be capable to pass on local channel state information to the AMP manager. In addition, the AMP manager should be capable to enable conversion of any L2CAP packet to an IEEE 802.15.3c compliant packet or vice-versa. The AMP manager should be capable to enable security to the level provided by BT. The AMP manager should be capable to shall not increase the device setup time. The AMP manager should be capable to shall support all the existing features of Bluetooth and IEEE 802.15.3c (or other equivalents and/or variants). Moreover, the AMP manager should be capable to support for simultaneous operation of any native IEEE 802.15.3c and Bluetooth AMP.

Figure 7:
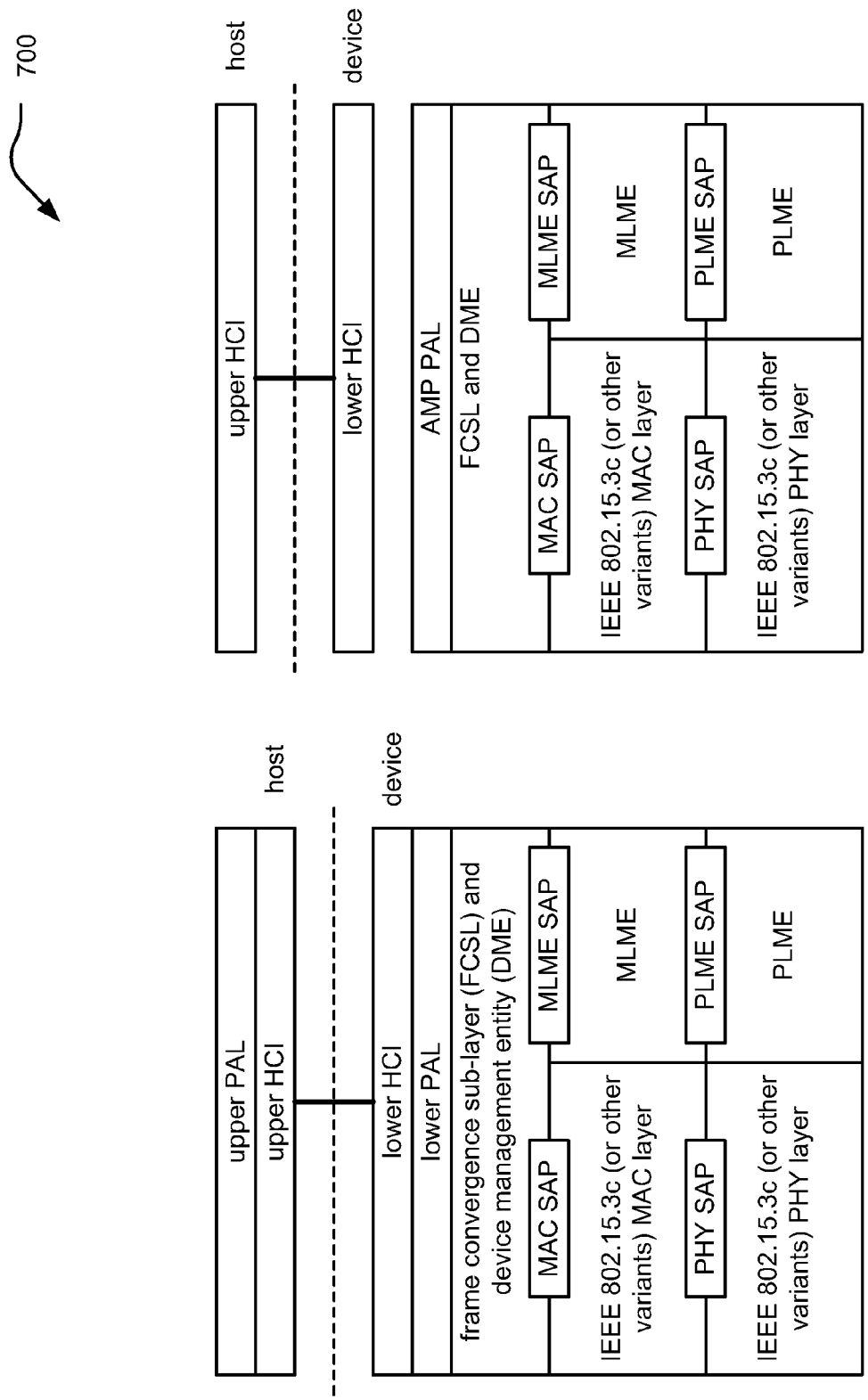
FIG. 7 is a diagram illustrating an embodiment of a protocol adaptation layer.

FIG. 7 is a diagram illustrating an embodiment of a protocol adaptation layer 700. This diagram shows some possible options of where the AMP/PAL may reside within a communication device. There are at least two possible options by which this may be effectuated.

In a first configuration, there can be two parts with upper part resides on the host side and the lower part resides on the device for the Host/Device configuration. Alternatively, in a second configuration, the AMP PAL shall reside in the device.

Figure 8:
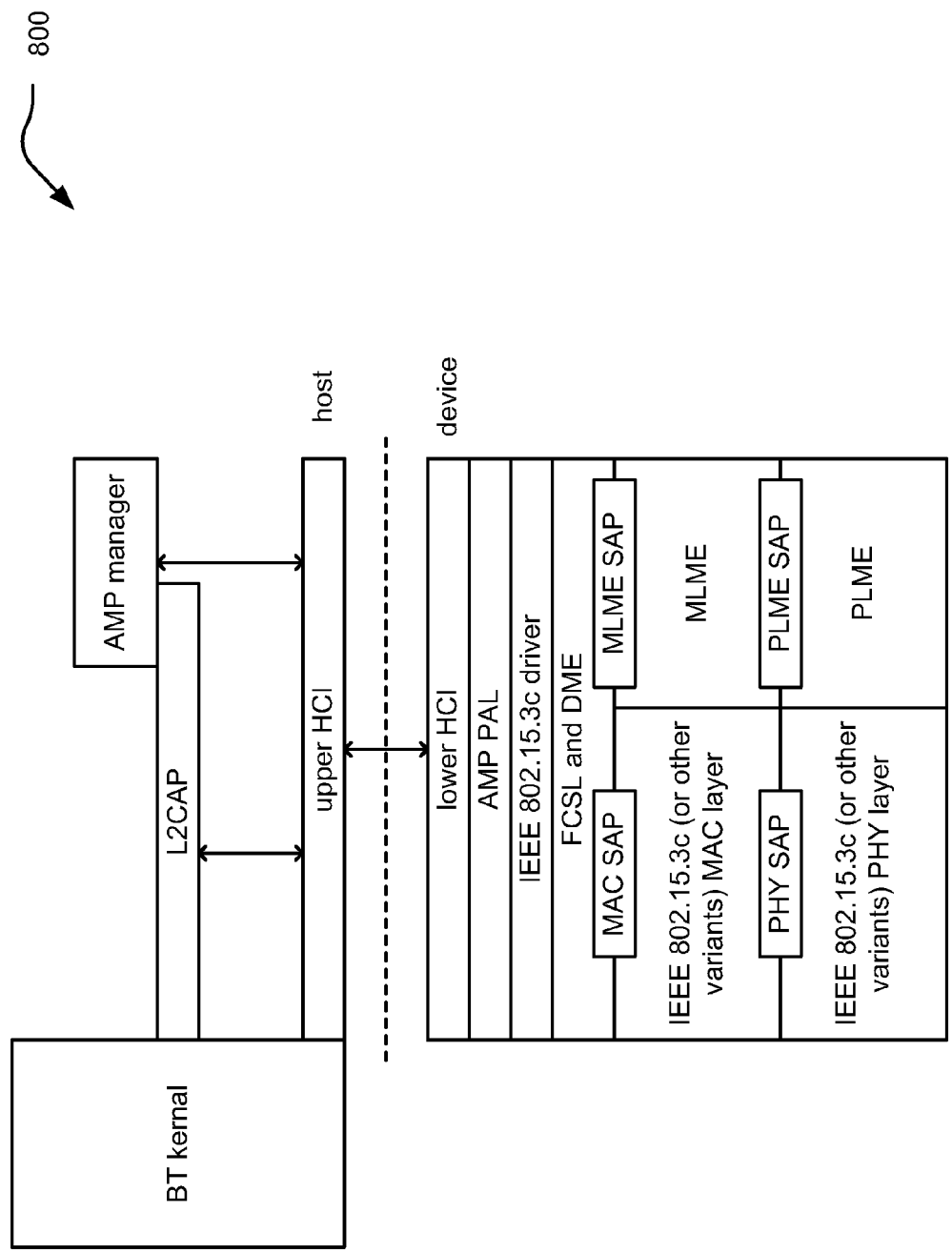
FIG. 8 is a diagram illustrating an alternative embodiment of a protocol adaptation layer.

FIG. 8 is a diagram illustrating an alternative embodiment of a protocol adaptation layer 800. Considering some of the previous diagrams, it can be seen that that there should be signals exchanged between the host communication interface (HCI), which is part of the PAL, and the IEEE 802.15.3c driver (as shown in this diagram). The Bluetooth kernel is given information as to when IEEE 802.15.3c AMP is disabled or enabled. The AMP PAL converts the signals from Bluetooth to appropriate primitives in order to be understood by the FCSL and DME in order to process over the air requests and vice-versa.

Considering an example, the AMP manager may be implemented and capable to obtain information as to the possible operating Modulation and Coding Schemes (MCSs) that this local communication device is capable of handling from the universal set that the IEEE 802.15.3c standard (or any variant thereof) supports.

Secondly, it can have a command that asks to read the Received Signal Strength Indicator/Channel Quality information (RSSI/CQI) information of the channel that is written into a register in the MAC/PHY interface for the PNC controller or neighboring devices with which it communicates.

Figure 9:
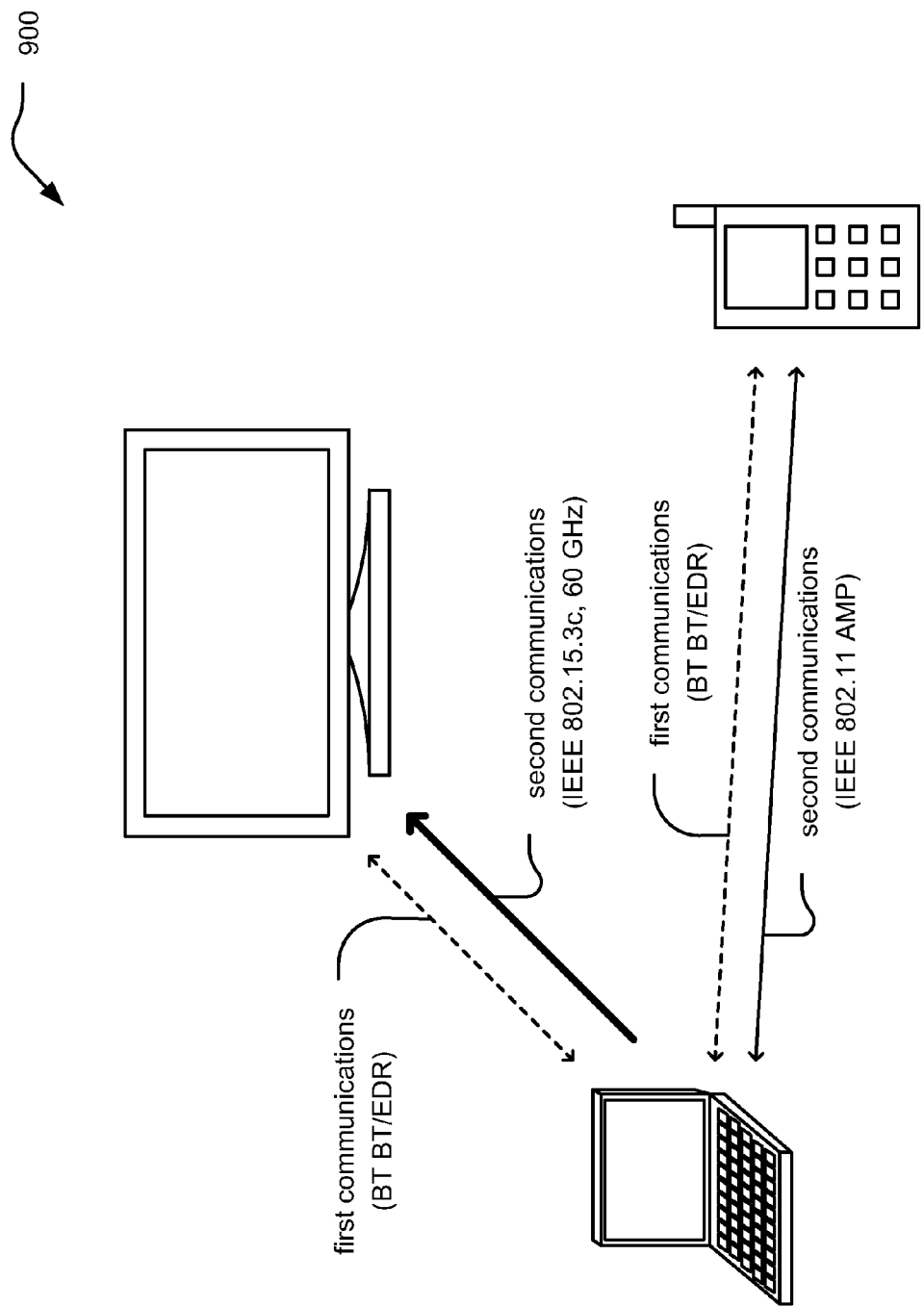
FIG. 9 is a diagram illustrating an alternative embodiment of a communication system including multi-protocol capable communication devices.

FIG. 9 is a diagram illustrating an alternative embodiment of a communication system 900 including multi-protocol capable communication devices. This diagram shows two possible embodiments therein.

In one embodiment, first and second communications being established between a first communication device (e.g., shown as a laptop computer in this embodiment) and a television (e.g., an HDTV capable television). The first communications are shown as being in accordance with Bluetooth and bi-directional in nature, while the second communications are shown as being in accordance with IEEE 802.15.3c or any variant thereof and being uni-directional in nature.

In another embodiment, first and second communications being established between the first communication device (e.g., shown as the laptop computer in this embodiment) and a personal wireless communication device. The first communications are shown as being in accordance with Bluetooth and bi-directional in nature, while the second communications are shown as being in accordance with IEEE 802.11 or any variant thereof and also being bi-directional in nature.

For example, Bluetooth can operate and enable the discovery and configuration of 60 GHz devices (e.g., those compliant with IEEE 802.15.3c or any of its variants). This will reduce costs of such devices by employing and enabling only uni-directional communication therewith (e.g., those 60 GHz devices need only have TX or RX functionality only, but not necessarily both).

The IEEE 802.15.3c MAC and Bluetooth AMP enhancements may be employed and/or needed to allow external configuration and single direction transmission.

For example, all of the communication devices within the communication system 1000 may operate to discover and pair via Bluetooth radio modules and/or protocol capabilities first. Then, the communication devices operate cooperatively to establish which device is the PNC. For example, the PNC capable device may be implemented to be a media server device (e.g., if only one such communication device within the communication system is capable to be the PNC). A particular communication device may be selected to be the PNC based on its permanence (e.g., selecting the media server or a television that doesn't move). Alternatively, a particular communication device may be selected to be the PNC based on the device not having any power constraints (e.g., not operating on a battery).

Referring again to the diagram, the PNC begins beaconing, and the devices request slots from the PNC over the Bluetooth link. Bi-directional 60 GHz communication links can employ Immediate or Block ACK in accordance with the IEEE 802.15.3c MAC layer. Analogously, uni-directional 60 GHz communication links can employ No-ACK in accordance with the IEEE 802.15.3c MAC layer. The L2CAP layer can signal re-transmission over Bluetooth (note this may have an associated relatively long latency).

Figure 10:
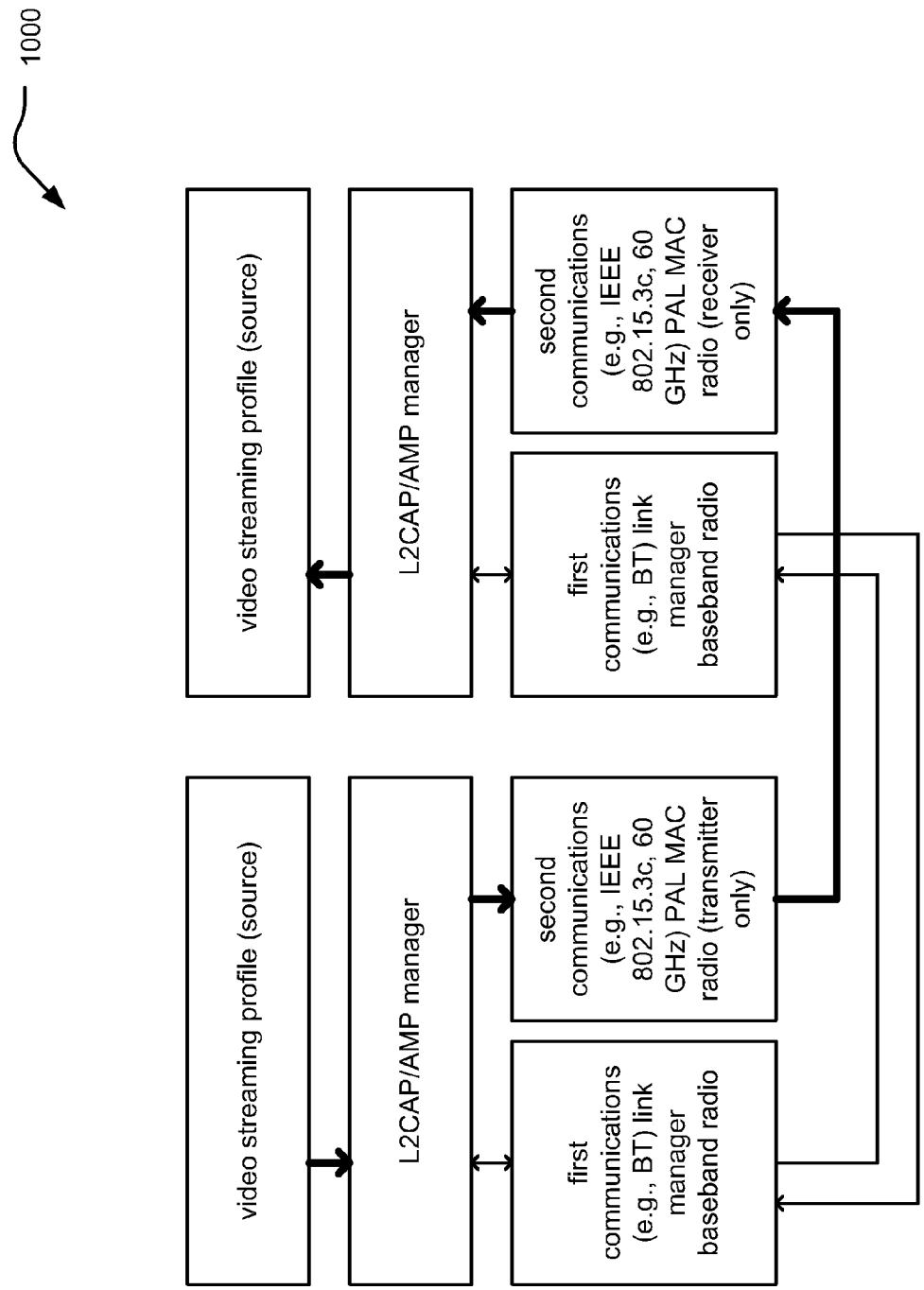
FIG. 10 is a diagram illustrating an embodiment of communication flow within the communication system of FIG. 9.

FIG. 10 is a diagram illustrating an embodiment of communication flow 1000 within the communication system 900 of FIG. 9. In this diagram, it can be seen that the AMP manager establishes connection between the communication device. The TX only device can send IEEE 802.15.3c beacons. However, no other communication devices can join the piconet without Bluetooth capability. No-ACK frames are sent over the 60 GHz path (i.e., the IEEE 802.15.3c path).

In accordance with unidirectional communications, certain issues may be further developed and addressed. For example, any authentication/association issues related to communications over Bluetooth may be addressed, security handshake over Bluetooth may be addressed, and frame re-tries may be pushed up to the L2CAP layer.

As mentioned above with respect to other embodiments, there are two separate embodiments described in which secondly established communications may operate: bi-directional signaling and uni-directional signaling. In accordance with the bi-directional signaling, both the initiator communication device and the responder communication device IEEE 802.15.3c PALs are capable of transmitting and receiving. However, in accordance with uni-directional signaling, it may be assumed that the initiator communication device initiates connections using the BR/EDR radio and is capable of only receiving; in alternative embodiments, the responder communication device is capable of only receiving.

The following FIG. 11, FIG. 12, FIG. 13, and FIG. 14 show various embodiments of bi-directional signaling and uni-directional signaling and beamforming therein, respectively.

Figure 11:
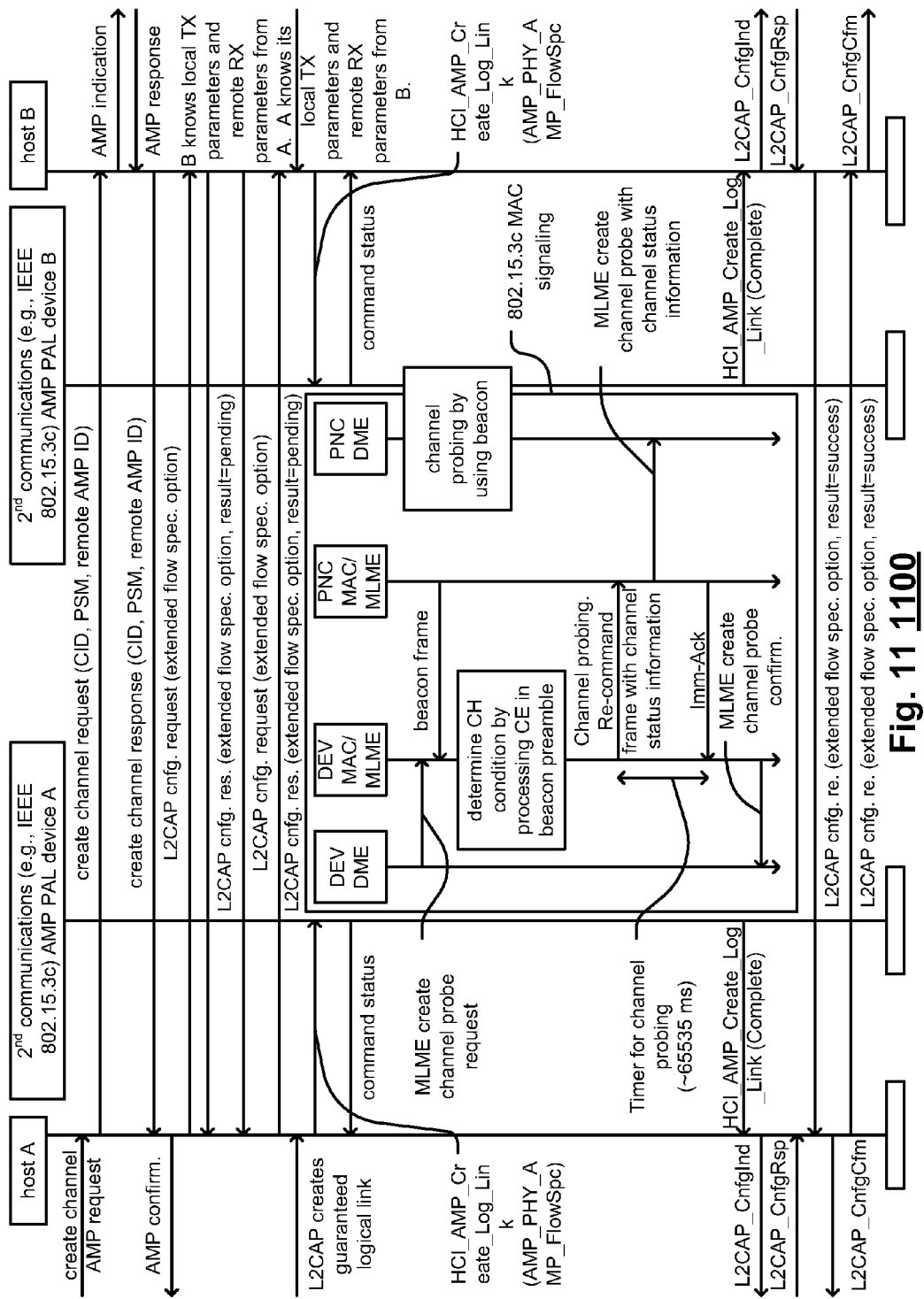
FIG. 11 is a diagram illustrating an embodiment of bi-directional signaling between multi-protocol capable communication devices.

FIG. 11 is a diagram illustrating an embodiment of bi-directional signaling 1100 between multi-protocol capable communication devices. This embodiment shows a particular bi-directional signaling for use with an IEEE 802.15.3c AMP. By employing such bi-directional signaling, a first communication link (e.g., Bluetooth) may be selectively terminated in some embodiments once IEEE 802.15.3c (e.g., 60 GHz) radio communications are established.

Initially, in the context of Bluetooth (BT), a channel request is created, and a corresponding channel response is created. The BT radios within the communication devices at the ends of the communication channel are initially employed to set up the MAC/PHYs within these respective communication devices.

After L2CAP configuration request and associated response are made, then beamforming is performed with respect to IEEE 802.15.3c (e.g., 60 GHz) radio communications. This may involve performing electronically sweeping one or more antennae in accordance with beam-forming/beam-steering to identify an appropriate operating point by which these IEEE 802.15.3c (e.g., 60 GHz) radio communications may be best or better supported between the two communication devices. Thereafter, a working IEEE 802.15.3c (e.g., 60 GHz) radio communication link is achieved. The hosting device (e.g., a first communication device) then can send data over the IEEE 802.15.3c (e.g., 60 GHz) radio communication link.

Figure 12:
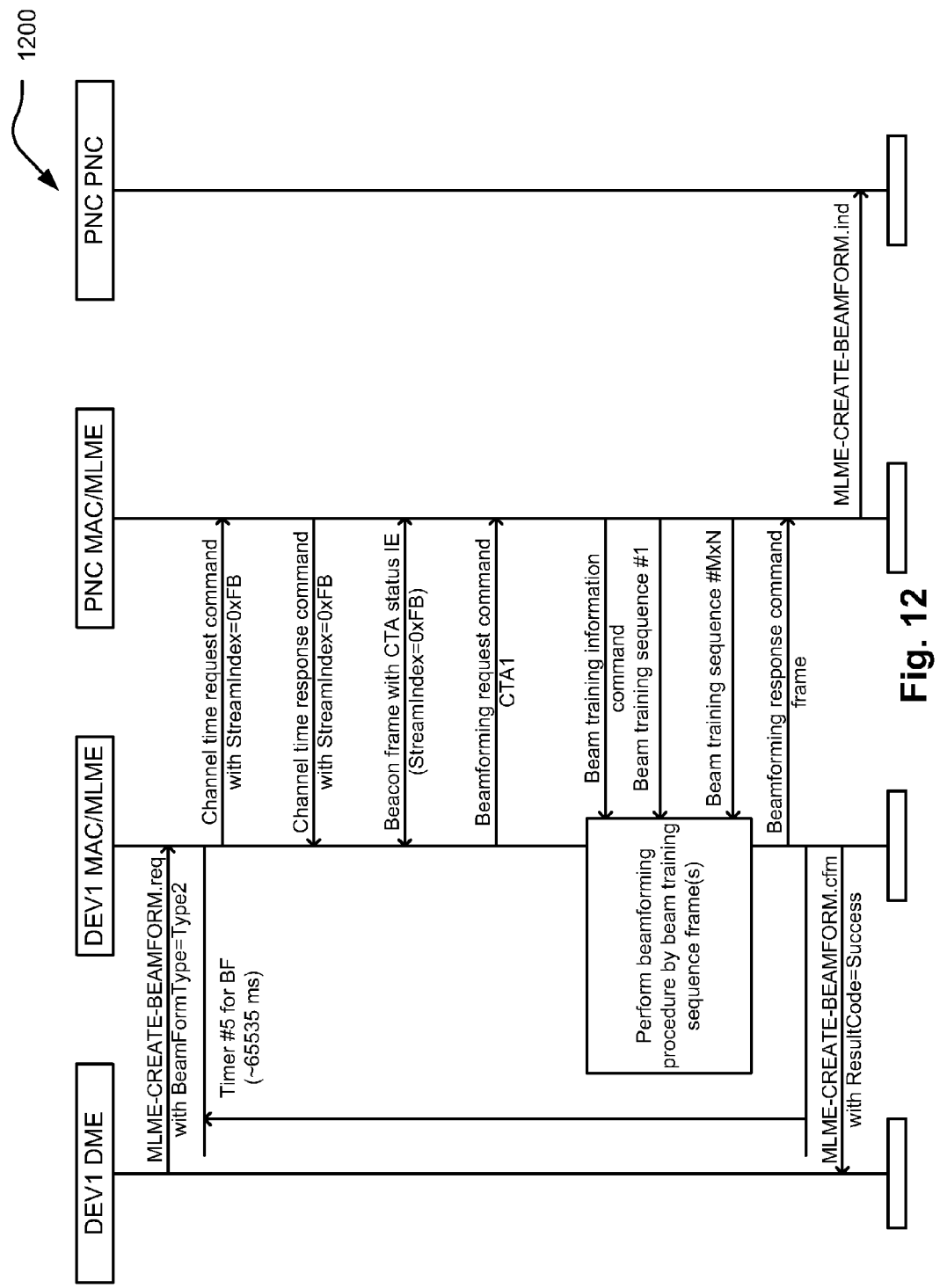
FIG. 12 is a diagram illustrating an embodiment of beamforming in accordance with bi-directional signaling between multi-protocol capable communication devices.

FIG. 12 is a diagram illustrating an embodiment of beamforming 1200 in accordance with bi-directional signaling between multi-protocol capable communication devices. This embodiment shows how one or more antennae (e.g., antenna array) may be configured (e.g., in accordance with beam-forming/beam-steering) in the context of a bi-directional signaling. Electronic sweeping of the one or more antennae (e.g., antenna array) may be performed to identify a desirable operating point therefore (e.g., maximum power transfer, lower/lowest noise, higher/highest SNR, etc.).

Figure 13:
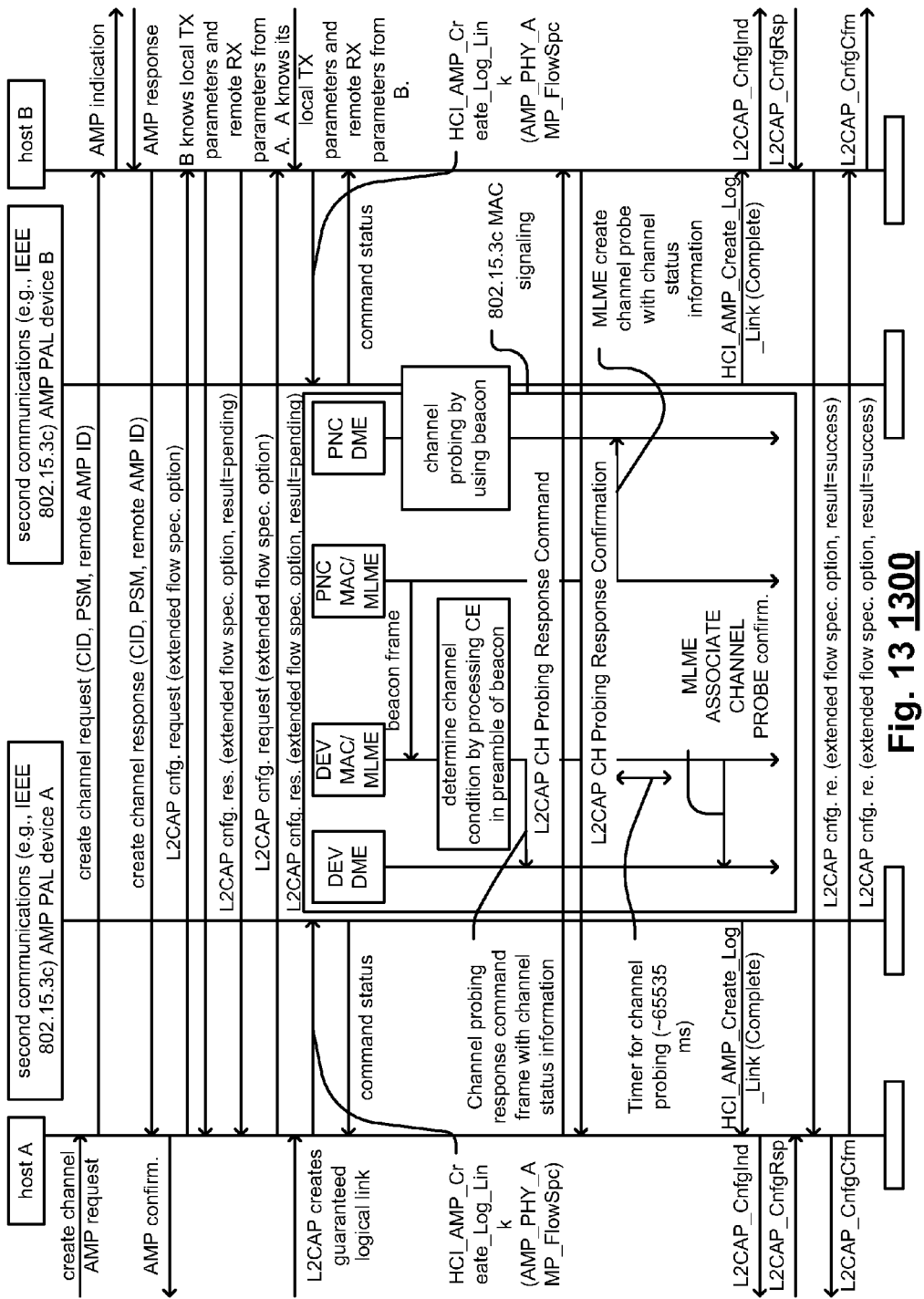
FIG. 13 is a diagram illustrating an embodiment of uni-directional signaling between multi-protocol capable communication devices.

FIG. 13 is a diagram illustrating an embodiment of uni-directional signaling 1300 between multi-protocol capable communication devices. This embodiment shows a particular uni-directional signaling for use with an IEEE 802.15.3c AMP.

This embodiment has some similarities to the embodiment of FIG. 11 (with at least one difference being the uni-directional nature of the IEEE 802.15.3c (e.g., 60 GHz) radio communications therein).

Initially, in the context of Bluetooth (BT), a channel request is created, and a corresponding channel response is created. The BT radios within the communication devices at the ends of the communication channel are initially employed to set up the MAC/PHYs within these respective communication devices.

Because of the very nature of the uni-directional IEEE 802.15.3c (e.g., 60 GHz) radio communications in this embodiment, feedback may not be provided via the IEEE 802.15.3c (e.g., 60 GHz) radio communication link. Any feedback (e.g., ACK) is passed up to the L2CAP layer and sent over a concurrently operating bi-directional communication link (e.g., Bluetooth).

Figure 14:
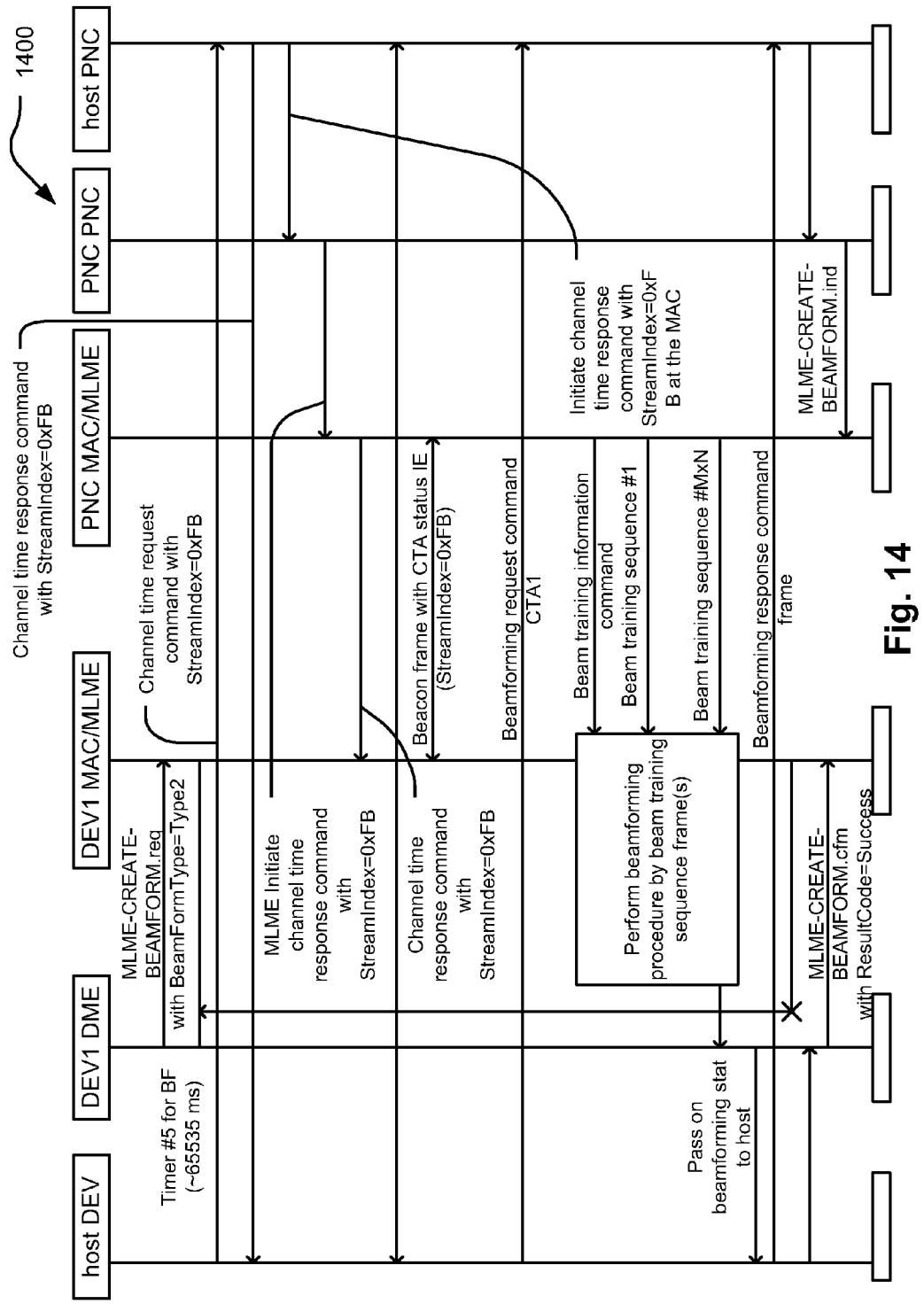
FIG. 14 is a diagram illustrating an embodiment of beamforming in accordance with uni-directional signaling between multi-protocol capable communication devices.

FIG. 14 is a diagram illustrating an embodiment of beam-forming 1400 in accordance with uni-directional signaling between multi-protocol capable communication devices.

This embodiment shows how one or more antennae (e.g., antenna array) may be configured (e.g., in accordance with beam-forming/beam-steering) in the context of a uni-directional signaling. Electronic sweeping of the one or more antennae (e.g., antenna array) may be performed to identify a desirable operating point therefore (e.g., maximum power transfer, lower/lowest noise, higher/highest SNR, etc.).

FIG. 15A, FIG. 15B, FIG. 16A, and FIG. 16B illustrate embodiments of various methods for performing bi-directional signaling and/or uni-directional signaling and beam-forming therein, respectively.

Referring to method 1500 of FIG. 15A, within a first communication device, the method 1500 begins by employing a first radio module to establish first communications with second communication device (using associated first communications protocol), as shown in a block 1510. The method 1500 continues by ascertaining capabilities of the second communication device to support second communications (using associated first communications protocol), as shown in a block 1520.

Within the first communication device, the method 1500 then operates by employing a second radio module to establish second communications with the second communication device (using associated second communications protocol), as shown in a block 1530.

Within the first communication device, the method 1500 continues by electronically sweeping antenna array to identify desired gain setting (e.g., maximum) of second communications with second communication device (beamforming), as shown in a block 1540. In some embodiments, in which a mechanical actuator may be attached/implemented in conjunction with one or more antennae, the mechanical actuator may perform the sweeping through the available range in which beam-forming/beam-steering may be performed. However, in many embodiments, the beam-forming/beam-steering may be performed using one or more antennae that are electronically adjustable to effectuate beam-forming/beam-steering by sweeping through the available range in which beam-forming/beam-steering may be performed. A desired setting (e.g., one that provides a maximum gain, least noise, highest signal to noise ratio (SNR), etc.) is then identified. The method 1500 then operates by supporting the second communications with identified antenna array gain setting, as shown in a block 1550.

Referring to method 1501 of FIG. 15B, within a first communication device, the method 1501 begins by employing a first radio module to establish first bi-directional communications with second communication device (using associated first communications protocol), as shown in a block 1511. Then, within first communication device, the method 1501 then operates by employing the first communications to configure/establish second bi-directional communications with the second communication device (supported using a second radio module of first communication device and using an associated second communications protocol), as shown in a block 1521.

In some embodiments, the method 1501 continues by terminating first bi-directional communications, as shown in a block 1531. For example, in this embodiment, the second communications, being bi-directional in nature, allows the first bi-directional communications to be terminated in desired instances. Alternatively, if desired, the first bi-directional communications may be maintained as a back-up to which the communications may be switch should some problem arise (e.g., signal degradation, increased noise, etc.) of the second bi-directional communications.

The method 1501 then operates by employing second bi-directional communications to manage second bi-directional communications, as shown in a block 1541.

Referring to method 1600 of FIG. 16A, within a first communication device, the method 1600 begins by employing a first radio module to establish first bi-directional communications with second communication device (using associated first communications protocol), as shown in a block 1610.

Within the first communication device, the method 1600 continues by employing first communications to configure/establish second uni-directional communications with second communication device (supported using second radio module of first communication device and using associated second communications protocol), as shown in a block 1620. The method 1600 then operates by employing first bi-directional communications to manage second uni-directional communications, as shown in a block 1630.

Referring to method 1601 of FIG. 16B, within a first communication device, the method 1601 begins by employing a first radio module to establish first communications with second communication device (using associated first communications protocol), as shown in a block 1611.

Within the first communication device, the method 1601 then operates by employing a second radio module to establish second communications with second communication device (using associated second communications protocol) and terminating first communications, as shown in a block 1621.

Based on a change (e.g., degradation) of the second communications, the method 1601 continues by employing first radio module to establish first communications with second communication device (using associated first communications protocol) and terminating second communications, as shown in a block 1631. As can be seen, communications may be switched back and forth, based on any of a number of factors (e.g., communication channel noise, reduction in SNR, communication link interruption, etc.), between the first communications (e.g., supported by first radio module and using first communications protocol) and the second communications (e.g., supported by second radio module and using second communications protocol).

It is noted that the various modules (e.g., radio modules, control modules, etc.) described herein may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The operational instructions may be stored in a memory. The memory may be a single memory device or a plurality of memory devices. Such a memory device may be a read-only memory, random access memory, volatile memory, non-volatile memory, static memory, dynamic memory, flash memory, and/or any device that stores digital information. It is also noted that when the processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. In such an embodiment, a memory stores, and a processing module coupled thereto executes, operational instructions corresponding to at least some of the steps and/or functions illustrated and/or described herein.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A communication device comprising:
   a first radio configured to support first communications with an other communication device;
   a second radio configured to support second communications with the other communication device as bi-directional or uni-directional; and
   a processor configured to:
      manage the second communications via the first communications when the second communications are uni-directional; and
      terminate the first communications when the second communications are bi-directional.

2. The communication device of claim 1 further comprising:
   the second radio configured firstly to support the second communications with the other communication device using first one or more operational parameters;
   the processor configured to identify second one or more operational parameters based on feedback received from the other communication device via the first communications when the second communications are uni-directional and via the second communications when the second communications are bi-directional; and
   the second radio configured secondly to support the second communications with the other communication device using the second one or more operational parameters.

3. The communication device of claim 1 further comprising:
   the processor configured to identify one or more beamforming parameters based on feedback received from the other communication device via the first communications when the second communications are uni-directional and via the second communications when the second communications are bi-directional; and
   the second radio configured to support the second communications with the other communication device using the one or more beamforming parameters.

4. The communication device of claim 1 further comprising:
   the first radio configured firstly to support the first communications to perform discovery of the other communication device and pairing of the other communication device with the communication device; and
   the second radio configured secondly to support the second communications with the other communication device after completion of the discovery and pairing.

5. The communication device of claim 1 further comprising:
   the first radio configured to support the first communications using a first communication protocol; and
   the second radio configured to support second communications using a second communication protocol that is bi-directional or a third communication protocol that is uni-directional.

6. The communication device of claim 1 further comprising:
   the first radio configured to support the first communications using a Bluetooth communication protocol; and
   the second radio configured to support the second communications using a wireless local area network (WLAN) communication protocol.

7. The communication device of claim 1 further comprising:
   the first radio configured to support the first communications within a first frequency band; and
   the second radio configured to support the second communications within a second frequency band.

8. The communication device of claim 1 further comprising:
a media server, wherein the other communication device is a media playback device that plays back media received from the media server.

9. A communication device comprising:
a first radio configured to support first communications to perform discovery of an other communication device and pairing of the other communication device with the communication device;
a second radio configured to support second communications with the other communication device as bi-directional or uni-directional and using one or more beamforming parameters after completion of the discovery and pairing; and
a processor configured to:
manage the second communications via the first communications when the second communications are uni-directional; and
terminate the first communications when the second communications are bi-directional; and
identify the one or more beamforming parameters for use by the second radio based on feedback received from the other communication device via the first communications when the second communications are uni-directional and via the second communications when the second communications are bi-directional.

10. The communication device of claim 9 further comprising:
the first radio configured to support the first communications using a first communication protocol; and
the second radio configured to support second communications using a second communication protocol that is bi-directional or a third communication protocol that is uni-directional.

11. The communication device of claim 9 further comprising:
the first radio configured to support the first communications using a Bluetooth communication protocol; and
the second radio configured to support the second communications using a wireless local area network (WLAN) communication protocol.

12. The communication device of claim 9 further comprising:
the first radio configured to support the first communications within a first frequency band; and
the second radio configured to support the second communications within a second frequency band.

13. The communication device of claim 9 further comprising:
a media server, wherein the other communication device is a media playback device that plays back media received from the media server.

14. A method for execution by a communication device, the method comprising:
operating a first radio to support first communications with an other communication device;
operating a second radio to support second communications with the other communication device as bi-directional or uni-directional;
managing the second communications via the first communications when the second communications are uni-directional; and
terminating the first communications when the second communications are bi-directional.

15. The method of claim 14 further comprising:
firstly operating the second radio to support the second communications with the other communication device using first one or more operational parameters;
receiving feedback from the other communication device via the first communications when the second communications are uni-directional and via the second communications when the second communications are bi-directional;
identifying second one or more operational parameters based on the feedback; and
secondly operating the second radio to support the second communications with the other communication device using the second one or more operational parameters.

16. The method of claim 14 further comprising:
receiving feedback from the other communication device via the first communications when the second communications are uni-directional and via the second communications when the second communications are bi-directional;
identifying one or more beamforming parameters based on the feedback; and
operating the second radio to support the second communications with the other communication device using the one or more beamforming parameters.

17. The method of claim 14 further comprising:
firstly operating the first radio to support the first communications to perform discovery of the other communication device and pairing of the other communication device with the communication device; and
secondly operating the second radio to support the second communications with the other communication device after completion of the discovery and pairing.

18. The method of claim 14 further comprising:
operating the first radio to support the first communications using a Bluetooth communication protocol; and
operating the second radio to support the second communications using a wireless local area network (WLAN) communication protocol.

19. The method of claim 14 further comprising:
operating the first radio to support the first communications within a first frequency band; and
operating the second radio to support the second communications within a second frequency band.

20. The method of claim 14, wherein the communication device is a media server, and wherein the other communication device is a media playback device that plays back media received from the media server.

\* \* \* \* \*